July 1, 1924.
E. J. TAYLOR
1,499,793
MOLD FOR THE MANUFACTURE OF RESILIENT TIRES
Filed March 17, 1923    2 Sheets-Sheet 1
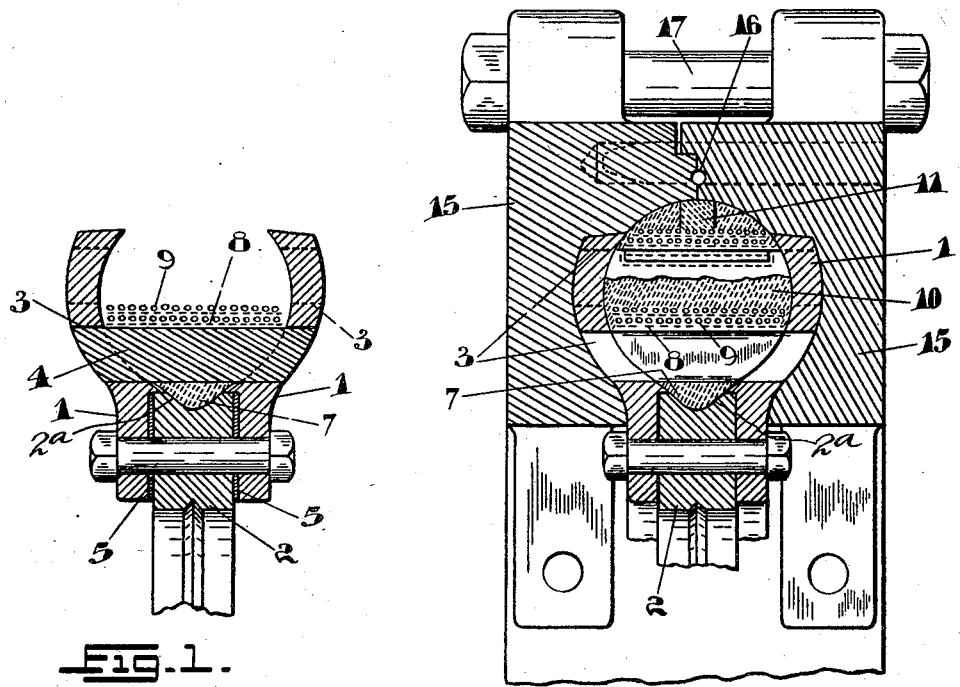
Fig.1.
Fig.2.
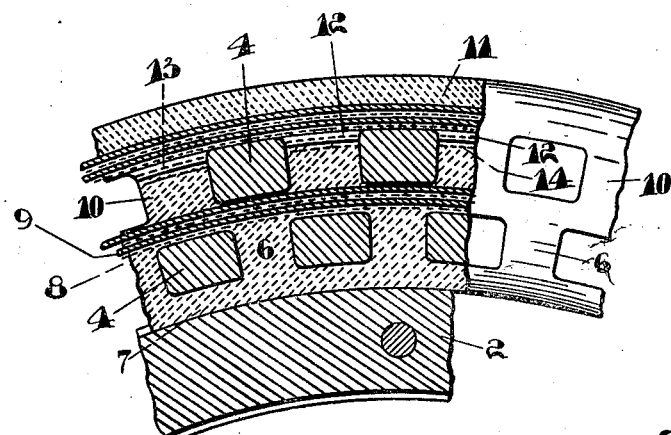
Fig.3.
Inventor
E. J. Taylor.
BY J. Edward Maybee.
Attorney Patented July 1, 1924.

1,499,793

UNITED STATES PATENT OFFICE.

ELI J. TAYLOR, OF TORONTO, ONTARIO, CANADA.

MOLD FOR THE MANUFACTURE OF RESILIENT TIRES.

Application filed March 17, 1923. Serial No. 625,873.

*To all whom it may concern:*

Be it known that I, ELI J. TAYLOR, of the city of Toronto, in the county of York, Province of Ontario, Canada, a subject of the King of Great Britain, have invented certain new and useful Improvements in Molds for the Manufacture of Resilient Tires, of which the following is a specification.

This invention relates to the manufacture of tires such as shown and described in my copending United States application No. 459,534 of April 8th, 1921. An important feature in the manufacture of such tires is construction of the tire so that the endless bands possess flexibility with practically no resiliency, and so that the resilient blocks and the bands are normally in a state of tension. To attain this result, I find it necessary to employ a special mold as hereinafter described and illustrated in the accompanying drawings.

Figure 4:
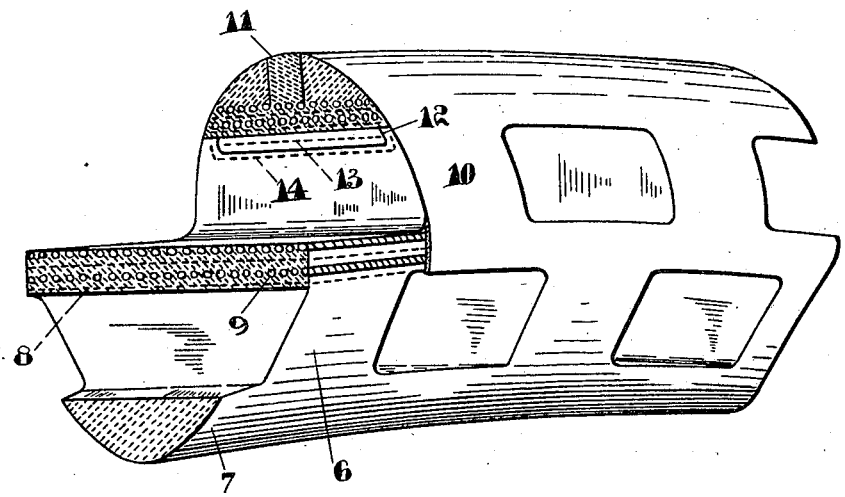
Figure 5:
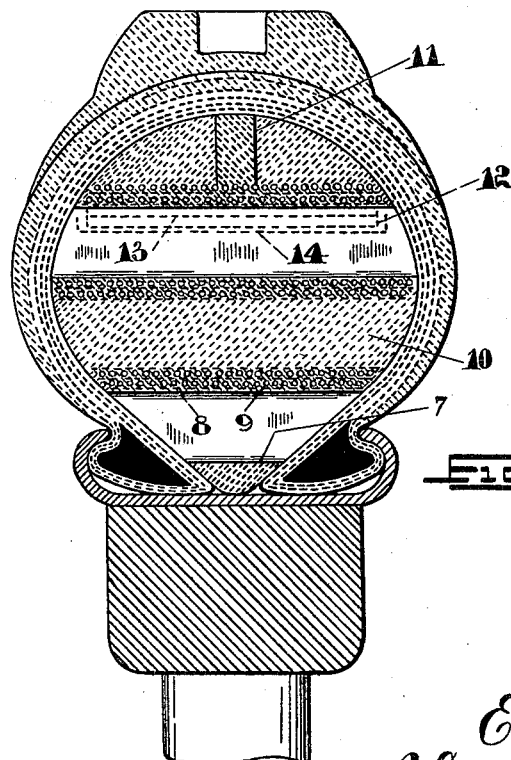

Fig. 1 is a cross section of a tire mold showing a tire partly built up therein;

Fig. 2 a cross section showing the mold as closed and with a completely built up tire in position and subjected to side pressure therein;

Fig. 3 a side elevation of a mold partly in section and with the built up tire therein shown in section;

Fig. 4 a perspective view, partly in section and partly broken away, of a portion of a tire without the outer cover; and Fig. 5 a cross section showing the tire complete in a clincher rim.

In the drawings like numerals of reference indicate corresponding parts in the different figures.

Referring particularly to Figures 1, 2 and 3 of the drawings, 1 are the two halves of the building mold, which are provided with flanges by means of which they may be bolted to the ring 2, which forms the rim side of the mold. In the periphery of the ring is formed a groove $2^a$ having outwardly flaring sides. Through the side walls of the halves of the mold are formed a plurality of holes 3, which are adapted to receive the transverse metal cores 4. These holes are arranged in a plurality of series and the holes are in staggered relationship as shown. The cores are formed to fit the holes in such a manner that they are easily inserted or removed by hand, but without leaving any material space into which soft rubber can penetrate.

In commencing the construction of the tire, the spacing of the side walls of the building mold is increased as indicated in Fig. 1 by placing on each side of the ring 2 an annular shim 5. There is then placed in position in the mold a series of resilient rubber blocks 6. While these might be separate, they are preferably connected with a rim band 7 adapted to be received in the groove $2^a$. Between the blocks the first row of cores 4 is inserted in position. The blocks 6 are so proportioned that they completely fill the cavities formed by the side walls of the mold and the sides of the cores, and also extend somewhat above the outer surfaces of the cores. Over the blocks and the cores I then wind a length of fabric 8. This band of fabric compresses the rubber blocks 6 and brings their outer surfaces down substantially to the level of the outer surfaces of the cores.

It should be mentioned that this fabric is first suitably frictioned with rubber. A frictioned or coated cord 9 is then wound under tension over the fabric ply. Over the cord I preferably apply a further ply of fabric over which a second ply of cord is stretched as before, and this process of applying alternate plies of fabric and cord may be repeated until a band of the desired strength is obtained, the number of plies employed depending on the size of the tire.

Over the band there is applied a series of spaced resilient rubber blocks 10. Between these blocks a second series of cores 4 are inserted in the second series of holes in the mold walls. As before, the rubber blocks will completely fill the spaces between the cores and side walls of the mold and will extend slightly beyond the outer surfaces of the cores. A second band of fabric, cord and rubber is then wound outside the second series of blocks and cores. If only two resilient and extensible bands are to be employed in the tire, the latter is now ready for the application of the tread cushion. If more than two are to be employed as indicated in Fig. 5, a further series of cores and blocks are placed in position and another inextensible band wound thereon. In most cases these bands are found to be sufficient.

The tread cushion is formed mainly of rubber compound possessing a moderate degree of resiliency, but incorporated therein round the tire and substantially in the median plane thereof is a band 11 of rubber of considerably greater resiliency than the rest of the tread cushion. This may be a distinct and separate band as illustrated in Fig. 2, or the increased resiliency along the median plane of the tread cushion may be obtained by using a decreased amount of filling material in the rubber compound along this portion of the tread cushion.

The result of the use of this specially constructed resilient band is that the tread cushion flattens transversely somewhat readily so that the pressure applied by contact with the road surface is taken up by the side portions of the tread to a much greater extent than would otherwise be the case.

I find it necessary, however, to provide yet further means for laterally distributing the stresses due to road pressure. I therefore apply between the outer inextensible band and each of the underlying blocks a spreader 12, which is made of a relatively rigid material, such, for example, as a rubber compound which will become relatively hard in the process of vulcanization. In this spreader there is preferably incorporated one or more plies of fabric 13.

Preferably in each of the outer blocks underlying the spreaders are incorporated one or more plies of fabric 14 extending out substantially to the sides of the blocks. These spreaders carry the pressure on the tread cushion and the underlying band well out to the sides of the underlying rubber blocks, so that the pressure is evenly borne by these blocks. By the use of these spreaders and the elastic centre band 11, I entirely overcome the tendency which otherwise exists for the outer rubber blocks to give way at a point at each side a short distance in from their outer ends.

While the blocks have been more or less compressed by the winding over them of the flexible and extensible bands, further compression is necessary to so intimately incorporate the various parts of the fabric of the tire that it becomes a substantially unitary structure and this is obtained by removing the shims 5 and closing up the halves of the building mold tightly to the ring 2 as shown in Fig. 2 as hereinafter described. Endwise pressure is thus applied to the blocks, which increases the compression of the blocks as desired. Referring to Figures 1 and 2 it will be noted that the movable side walls of the building mold are flared outwardly so that the first or inner series of blocks 6 are compressed between the bottom of the mold and the lower band of fabric 8 and cords 9, and the second series of blocks 10 are compressed between the lower and outer bands. This arrangement produces an outward pressure of the blocks against the adjacent bands thus normally holding the latter taut. It will also be noted that the outwardly flaring sides of the mold 1 are adapted to substantially form a continuation of the contour of the outwardly flared sides of the groove when the shims are removed.

The curing mold 15, also formed in halves, is adapted to enclose the movable halves of the building mold 1. The latter terminates substantially at the beginning of the tread portion of the tire and the halves of the curing mold are shaped to correspond with the building half molds and are grooved to form the convex tire tread.

From the above description it will be seen that any desired hydraulic pressure may be applied to the sides of the curing mold to exert an end pressure on the blocks 6 and 10 and thus exert an outward pressure on the bands and the bolts 17, passing through lugs formed on the half molds 15, may be used to maintain this pressure. When it is desired to pile a number of molds on a hydraulic press, the bolts 17 on one mold are arranged in staggered relationship with the bolts on the adjacent molds.

The tire is then subjected to vulcanizing heat while contained in the mold and, after the vulcanizing action is complete, is removed. It is then found that owing to the extreme hydraulic pressure applied to the blocks during the process of curing the tire that the tire will hold up substantially to its true circular form when stood upright on a supporting surface.

In practice the tire is used within an outer casing, which may be of any ordinary form. Preferably the outer surfaces of the inner series of rubber blocks 6 are inclined inwardly so that the walls of an outer casing such as shown in Fig. 5 when forced into position in the rim exert an inward pressure on these inclined surfaces, which is resolved partly in an upward direction and serves to maintain these blocks in a state of compression so that the tire fits snugly and closely within the outer casing.

Owing to the fact that the outer casing does not require to withstand any air pressure, its tread surface may be increased in thickness and its side walls made sufficiently light to possess a maximum of durability under constant flexing. Such outer casings will be found to be much more durable than those of the ordinary type in which the necessary strength in the side walls to withstand air pressure can only be obtained by using so much fabric that the constant flexing destroys the stiff fabric and permits blow-outs of the side walls to take place.

What I claim is:—

1. A mold for forming tires such as herein described comprising a ring, two side wall half molds adapted to be secured to the ring, said half molds having a series of holes therein for the passage of transverse metal cores; shims between the outer sides of the ring and the half molds removable to allow of the contraction of the mold; and a divided outer mold adapted to enclose the aforesaid half molds and to shape up the tread of the tire.

2. A mold for forming tires such as herein described comprising a ring, two outwardly flared side wall half molds adapted to be secured to the ring, provided with a groove in its periphery, the groove having outwardly flared sides, said half molds having a series of holes therein for the passage of transverse metal cores; and shims between the outer sides of the ring and the half molds removable to allow of the contraction of the mold, the outwardly flared sides of the molds being adapted to substantially form a continuation of the contour of the outwardly flared sides of the groove when the shims are removed.

3. A mold for forming tires such as herein described comprising a ring, two outwardly flared side wall half molds carried by the ring and adapted to be moved towards one another to produce an outward pressure on the tire; and a divided curing mold adapted to enclose and engage the aforesaid half molds.

4. A mold for forming tires such as herein described comprising a ring, two outwardly flared side wall half molds adapted to enclose an inner portion of the tire and suitably carried by the ring so that they may be moved towards one another to produce an outward pressure on the tire; and a divided curing mold adapted to engage the aforesaid half molds and to enclose the outer portion of the tire to shape up the latter.

Signed at Toronto, Ontario, Canada, this ninth day of March, 1923.

ELI J. TAYLOR.